United States Patent
Hong

(10) Patent No.: US 10,514,794 B2
(45) Date of Patent: Dec. 24, 2019

(54) TOUCH SENSOR AND DISPLAY DEVICE INCLUDING THE SAME

(71) Applicant: Samsung Display Co., Ltd., Yongin-si (KR)

(72) Inventor: Won-Ki Hong, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 57 days.

(21) Appl. No.: 15/961,336

(22) Filed: Apr. 24, 2018

(65) Prior Publication Data
US 2019/0102013 A1 Apr. 4, 2019

(30) Foreign Application Priority Data
Sep. 29, 2017 (KR) .......... 10-2017-0127796

(51) Int. Cl.
| G06F 3/041 | (2006.01) |
| G06F 3/043 | (2006.01) |
| G06F 3/044 | (2006.01) |

(52) U.S. Cl.
CPC .......... *G06F 3/0412* (2013.01); *G06F 3/0416* (2013.01); *G06F 3/0433* (2013.01); *G06F 3/0443* (2019.05); *G06F 3/0448* (2019.05); *G06F 2203/04102* (2013.01); *G06F 2203/04106* (2013.01)

(58) Field of Classification Search
None
See application file for complete search history.

(56) References Cited

U.S. PATENT DOCUMENTS

| 8,665,236 | B2* | 3/2014 | Myers | G06F 1/1626 345/173 |
| 2006/0125804 | A1* | 6/2006 | Kent | G06F 3/0418 345/177 |
| 2014/0085213 | A1 | 3/2014 | Huppi et al. | |
| 2014/0092064 | A1 | 4/2014 | Bernstein et al. | |
| 2017/0131806 | A1 | 5/2017 | Ando et al. | |
| 2017/0235395 | A1* | 8/2017 | Long | G02F 1/13338 345/174 |

FOREIGN PATENT DOCUMENTS

| JP | 6123947 | 5/2017 |
| JP | WO2016027818 | 6/2017 |
| KR | 100754883 | 8/2007 |

* cited by examiner

*Primary Examiner* — Kenneth B Lee, Jr.
(74) *Attorney, Agent, or Firm* — Cantor Colburn LLP

(57) ABSTRACT

A touch sensor includes a plurality of touch electrode lines which extends outwardly from a central portion thereof at a predetermined angular interval around the central portion, a vibration sensing element positioned at the central portion, and a touch controller which receives a first touch signal from at least one of the plurality of touch electrode lines, detects a touch angle between a touch position at which a touch occurs and a first direction with respect to the central portion, receives a second touch signal from the vibration sensing element, calculates a touch distance from the central portion to the touch position based on a time difference between a first point of time when the first touch signal is received and a second point of time when the second touch signal is received, and outputs touch coordinates including the touch angle and the touch distance.

20 Claims, 11 Drawing Sheets

TOUCH SENSOR AND DISPLAY DEVICE INCLUDING THE SAME

This application claims priority to Korean Patent Application No. 10-2017-0127796, filed on Sep. 29, 2017, and all the benefits accruing therefrom under 35 U.S.C. § 119, the content of which in its entirety is herein incorporated by reference.

BACKGROUND

(a) Field

Exemplary embodiments of the invention relate to a touch sensor and a display device including the same. More particularly, the invention relates to a touch sensor of a cylindrical coordinate system type and a display device including the same.

(b) Description of the Related Art

A display panel is a device for displaying an image on a flat or curved display area. As a touch sensor is provided on a front surface of such a display panel, a display device having a touch detection function has been generally used.

Flexible display panels have been developed, and techniques for applying the flexible display panels to surfaces of various three-dimensional shapes have been researched. It is preferred to provide a touch sensor at a display panel having a three-dimensional shape so that a user may variously and conveniently perform input.

When the display panel is applied to a surface of a device having a three-dimensional shape such as a cylindrical speaker, the display panel is also provided with the touch sensor sometimes. When a conventional planar touch sensor is applied to the surface of the three-dimensional shape, it is difficult to dispose the touch electrodes in some areas thereof, thus the touch detection may be restricted, a manufacturing process time increases, and a manufacturing cost increases.

SUMMARY

Exemplary embodiments of the invention have been made in an effort to provide a touch sensor that may be applied to an object having a three-dimensional shape such as a cylindrical shape, and a display device including the same.

An exemplary embodiment of the invention provides a touch sensor including a plurality of touch electrode lines which extends outwardly from a central portion thereof at a predetermined angular interval around the central portion, a vibration sensing element positioned at the central portion, and a touch controller which receives a first touch signal from at least one of the plurality of touch electrode lines, detects a touch angle between a touch position at which a touch occurs from a first direction with respect to the central portion, receives a second touch signal from the vibration sensing element, calculates a touch distance from the central portion to the touch position based on a time difference between a first point of time when the first touch signal is received and a second point of time when the second touch signal is received, and outputs touch coordinates including the touch angle and the touch distance.

In an exemplary embodiment, the touch sensor may further include a first active region which includes the central portion and is parallel to a plane defined by the first direction and a second direction perpendicular to the first direction and a second active region which is connected to an edge of the first active region and includes a lateral surface extending in a direction traversing the plane.

In an exemplary embodiment, each of the plurality of touch electrode lines may include a first touch electrode line which extends to be parallel to the plane along the first active region and a second touch electrode line that is connected to the first touch electrode line and extends in the direction traversing the plane along the second active region.

In an exemplary embodiment, the direction traversing the plane may be a third direction perpendicular to the plane, and the first active region and the second active region may define a cylindrical shape.

In an exemplary embodiment, the direction traversing the plane may form an acute angle with the plane, and the first active region and the second active region may define a conical pillar shape of which an area of a cross-section parallel to the plane gradually decreases toward a third direction perpendicular to the plane.

In an exemplary embodiment, the touch sensor may further include a spherical active region provided with a surface which includes the central portion, where the plurality of touch electrode lines may extend along the surface of the spherical active region.

In an exemplary embodiment, the touch sensor may further include a hemispherical active region provided with a surface which includes the central portion, where the plurality of touch electrode lines may extend along the surface of the hemispherical active region.

Another embodiment of the invention provides a touch sensor including a first active region which is a plane parallel to a first direction and a second direction perpendicular to the first direction, a second active region which is connected to an edge of the first active region and includes a lateral surface of a direction traversing the plane, a vibration sensing element positioned at a central portion of the first active region, a plurality of second touch electrode lines extending in the direction traversing the plane along the second active region, and a touch controller which receives a first touch signal from at least one of the plurality of second touch electrode lines, detects a touch angle between a touch position at which a touch occurs and the first direction with respect to the central portion, receives a second touch signal from the vibration sensing element, calculates a touch distance from the touch position to the first active region based on a time difference between a first point of time when the first touch signal is received and a second point of time when the second touch signal is received, and outputs touch coordinates including the touch angle and the touch distance.

In an exemplary embodiment, the direction traversing the plane may be a third direction perpendicular to the plane, and the first active region and the second active region may define a cylindrical shape.

In an exemplary embodiment, the touch sensor may further include a plurality of first touch electrode lines which extends outwardly from the central portion at a predetermined angular interval around the central portion of the first active region and is connected to the plurality of second touch electrode lines.

In an exemplary embodiment, the direction traversing the plane may form an acute angle with the plane, and the first active region and the second active region may define a conical pillar shape of which an area of a cross-section parallel to the plane gradually decreases toward a third direction perpendicular to the plane.

Still another embodiment of the invention provides a display device including an active region which includes a plurality of pixels which displays an image, a plurality of touch electrode lines which extends outwardly from a central portion of the active region at a predetermined angular interval around the central portion of the active region, a vibration sensing element positioned at the central portion, and a touch controller which receives a first touch signal from at least one of the plurality of touch electrode lines, detects a touch angle between a touch position at which a touch occurs in a first direction with respect to the central portion, receives a second touch signal from the vibration sensing element, calculates a touch distance from the central portion to the touch position based on a time difference between a first point of time when the first touch signal is received and a second point of time when the second touch signal is received, and outputs touch coordinates including the touch angle and the touch distance.

In an exemplary embodiment, the active region may further include a first active region which includes the central portion and is a plane parallel to the first direction and a second direction perpendicular to the first direction, and a second active region which is connected to an edge of the first active region and includes a lateral surface in a direction traversing the plane.

In an exemplary embodiment, each of the plurality of touch electrode lines may include a first touch electrode line which extends in a direction parallel to the plane along the first active region, and a second touch electrode line which is connected to the first touch electrode line and extends in the direction traversing the plane along the second active region.

In an exemplary embodiment, the direction traversing the plane may be a third direction perpendicular to the plane, and the first active region and the second active region may define a cylindrical shape.

In an exemplary embodiment, the direction traversing the plane may form an acute angle with the plane, and the first active region and the second active region may define a conical pillar shape of which an area of a cross-section parallel to the plane gradually decreases toward a third direction perpendicular to the plane.

In an exemplary embodiment, the active region may include a spherical active region provided with a surface including the central portion, and the plurality of touch electrode lines may extend along the surface of the spherical active region.

In an exemplary embodiment, the active region may include a hemispherical active region provided with a surface including the central portion, and the plurality of touch electrode lines may extend along the surface of the hemispherical active region.

In an exemplary embodiment, the active region may include a symmetric three-dimensional shape including one of a cylindrical shape, a conical pillar shape, a spherical shape, and a hemispherical shape, and the display device may further include a speaker on which the active region of the symmetric three-dimensional shape is mounted and a vibration absorbing layer positioned between the active region and the speaker and which blocks a vibration caused by a sound of the speaker.

In an exemplary embodiment, the touch controller may store a characteristic of a vibration caused by a touch, receive a signal corresponding to the characteristic of the vibration caused by the touch as the second touch signal, and process a signal that does not correspond to the characteristic of the vibration caused by the touch of as a noise.

According to the exemplary embodiment of the invention, since it is possible to reduce the number of touch electrode lines required for a touch sensor applied to an object having a three-dimensional shape such as a cylindrical shape, it is possible to prevent formation of a region in which touch detection is restricted, reduce a manufacturing time and cost of the touch sensor, and increase a manufacturing yield of the touch sensor.

DETAILED DESCRIPTION

Figure 1:
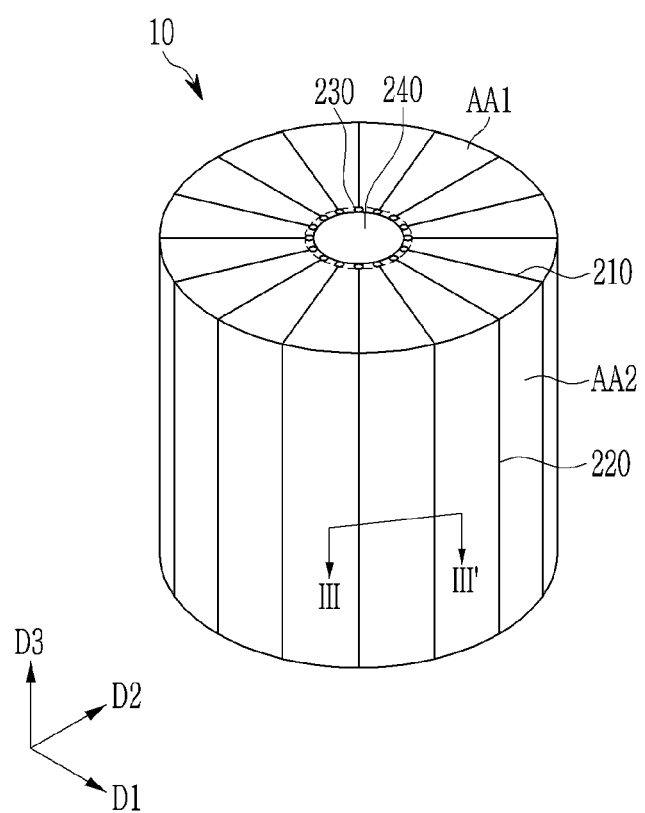
FIG. 1 illustrates an exemplary embodiment of a display device including a touch sensor according to the invention.

Exemplary embodiment of the invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the invention.

Parts that are irrelevant to the description will be omitted to clearly describe the invention, and like reference numerals designate like elements throughout the specification.

The size and thickness of each component shown in the drawings are arbitrarily shown for better understanding and ease of description, but the invention is not limited thereto. In the drawings, the thickness of layers, films, panels, regions, etc., are exaggerated for clarity. For better understanding and ease of description, the thickness of some layers and areas is exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the word "overlapped" means a vertically overlapped state in a cross-section, or an entirely or partially positioned state in the same region in a plan view.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items.

Hereinafter, an exemplary embodiment of a display device including a touch sensor according to the invention will be described with reference to FIG. 1 to FIG. 3.

FIG. 1 illustrates an exemplary embodiment of a display device including a touch sensor according to the invention. FIG. 2 illustrates an exemplary embodiment of a touch controller connected to a pad portion and a vibration sensing element of the display device of FIG. 1. FIG. 3 illustrates a cross-sectional view of the display device taken along line III-III' of FIG. 1.

Figure 2:
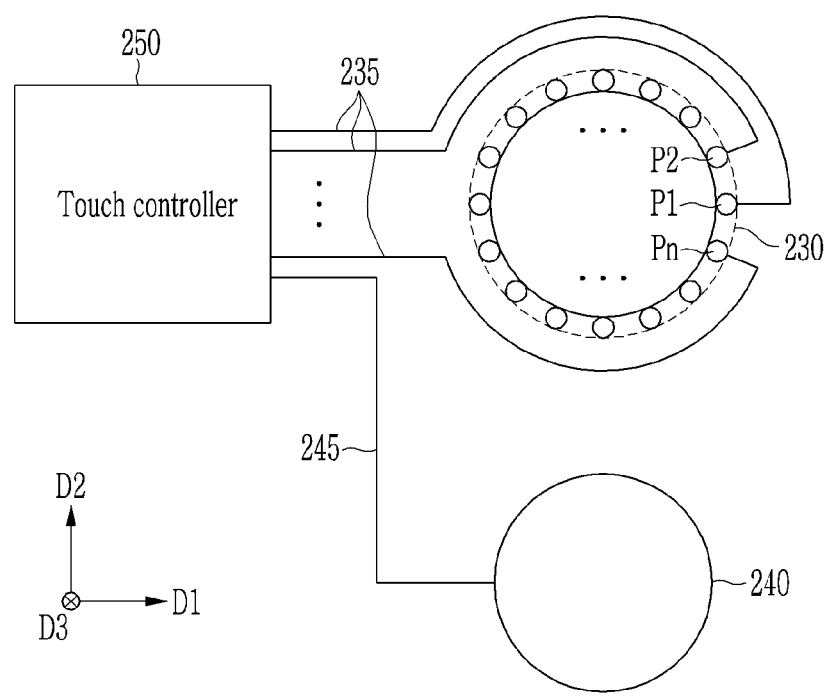
FIG. 2 illustrates an exemplary embodiment of a touch controller connected to a pad portion and a vibration sensing element of the display device of FIG. 1.
Figure 3:
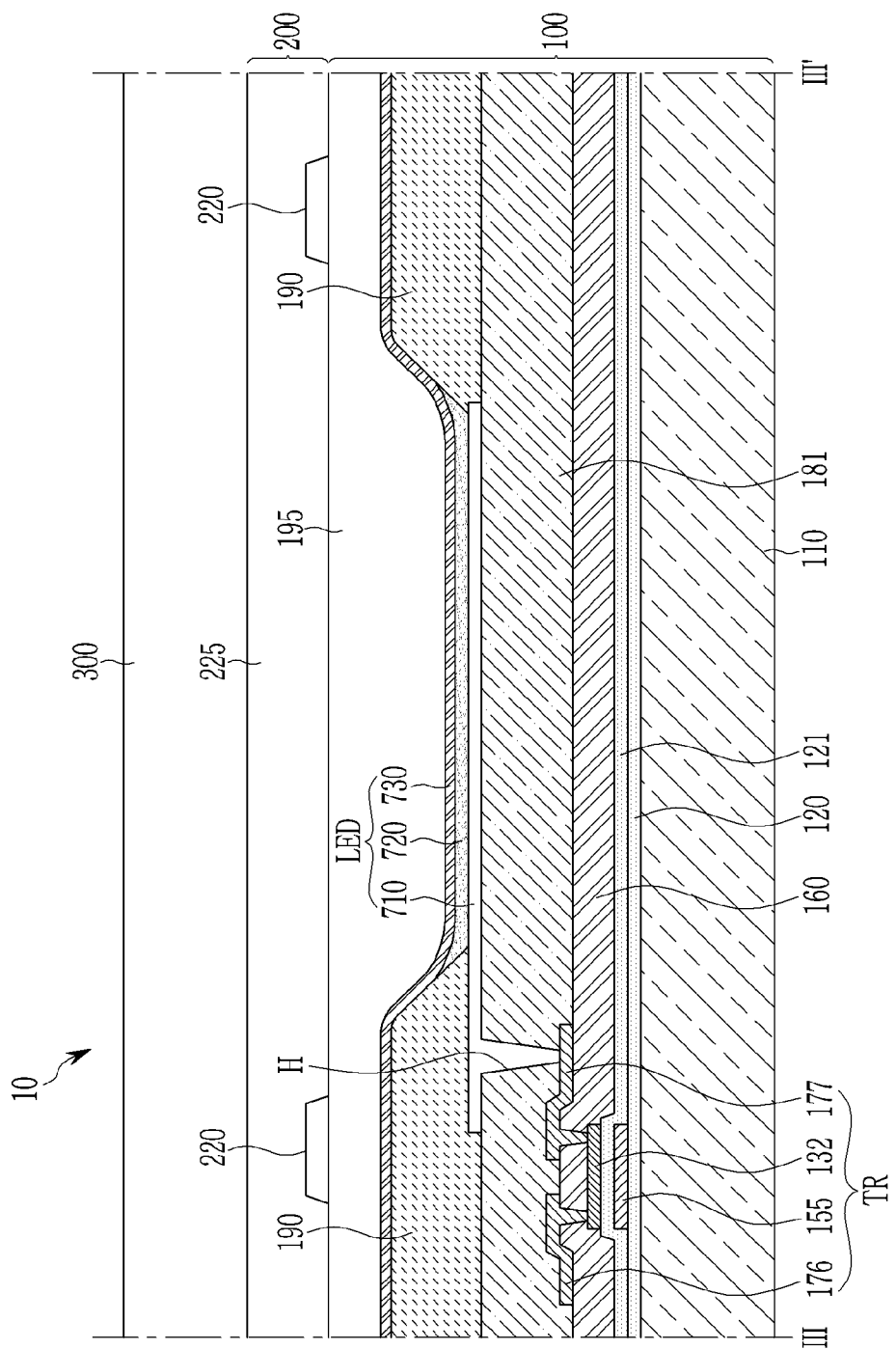
FIG. 3 illustrates a cross-sectional view of the display device taken along line III-III' of FIG. 1.

Referring to FIG. 1 to FIG. 3, a display device 10 includes a first active region AA1, a second active region AA2, a plurality of first touch electrode lines 210 positioned in the first active region AA1, a plurality of second touch electrode lines 220 positioned in the second active region AA2, a pad portion 230 connected to the plurality of first touch electrode lines 210, a vibration sensing element 240 positioned at a central portion of the first active region AA1, and a touch controller 250.

The first active region AA1 may have a substantially circular shape parallel to a plane defined or formed by a first direction D1 and a second direction D2. The second direction D2 is perpendicular to the first direction D1. The first active region AA1 may include a plurality of pixels (not shown) to display an image. Although it is exemplarily shown that the first active region AA1 has the circular shape in FIG. 1, the first active region AA1 may have an elliptical, polygonal, or irregular planar shape in other exemplary embodiments.

The second active region AA2 is connected to an edge of the first active region AA1, and may include a lateral surface extending in a direction traversing the plane defined or formed by the first direction D1 and the second direction D2. The lateral surface of the second active region AA2 may be connected to the edge of the first active region AA1 to be provided as or form a lateral surface of a cylindrical three-dimensional shape. As shown in FIG. 1, the second active region AA2 may include or form a cylindrical lateral surface extending in a third direction D3 perpendicular to the plane defined or formed by the first direction D1 and the second direction D2. That is, as shown in FIG. 1, the first active region AA1 and the second active region AA2 may form a cylindrical shape. The cylindrical shape may have the same cross-sectional area parallel to the plane defined or formed by the first direction D1 and the second direction D2 along the third direction D3.

The second active region AA2 may include a plurality of pixels (not shown) for displaying an image. The image displayed in the second active region AA2 may be different from that displayed in the first active region AA1. Alternatively, in some exemplary embodiments, the same image may be displayed in the first active region AA1 and the second active region AA2, or an image may be displayed in only one of the first active region AA1 and the second active region AA2.

The plurality of first touch electrode lines 210 positioned in the first active region AA1 may extend from a central portion of the first active region AA1 to the outside thereof at a predetermined angular interval around the central portion of the first active region AA1 in which the vibration sensing element 240 is positioned. That is, the plurality of first touch electrode lines 210 may radially extend from the central portion of the first active region AA1. The plurality of first touch electrode lines 210 may extend to be parallel to the plane defined or formed by the first direction D1 and the second direction D2 on the first active region AA1. As shown in FIG. 1, one end of the first touch electrode line 210 may be connected to the pad portion 230, and the other end of the first touch electrode line 210 may be positioned at the edge of the first active region AA1. Although it is exemplarily shown that the first touch electrode line 210 is a straight line in FIG. 1, the first touch electrode line 210 may be provided as or formed in a sector shape of which a width gradually increases from the central portion of the first active region AA1 to an edge thereof in another exemplary embodiment.

The plurality of second touch electrode lines 220 may be connected to the plurality of first touch electrode lines 210, and may extend in a direction traversing the plane defined or formed by the first direction D1 and the second direction D2 on the second active region AA2. As shown in FIG. 1, one end of the second touch electrode line 220 may be connected to the other end of the first touch electrode line 210 at the edge of the first active region AA1, and the second touch electrode line 220 may extend in the third direction D3 on the second active region AA2.

The second touch electrode lines 220 may be provided in a number corresponding to the number of the first touch electrode lines 210. The first touch electrode line 210 and the second touch electrode line 220 connected to the first touch electrode line 210 may form one touch electrode for sensing a touch.

The number and width of the first touch electrode lines 210 and the second touch electrode lines 220 are not limited, and may be variously selected according to an exemplary embodiment. In an exemplary embodiment, for example, as a width of the first active region AA1 is wider, the number of the first touch electrode lines 210 may be increased or the width of the first touch electrode lines 210 may be provided as or formed wider. In this case, the number of the second touch electrode lines 220 may be provided to correspond to the number of the first touch electrode lines 210. In addition, in the edge of the first active region AA1, the width of the second touch electrode line 220 may be determined to correspond to the width of the first touch electrode line 210. In an exemplary embodiment, for example, in the edge of the first active region AA1, when the first touch electrode line 210 is provided or formed to have a width of about 4 mm, the second touch electrode line 220 may be provided or formed to have a width of about 4 mm.

The pad portion 230 may be positioned at the central portion of the first active region AA1 to be connected to one end of each of the plurality of first touch electrode lines 210. As shown in FIG. 2, the pad portion 230 may include a plurality of pads P1-Pn corresponding to the plurality of first touch electrode lines 210. In this case, n is a natural number of equal to or greater than 1, and the number of the plurality of pads P1-Pn may correspond to the number of the plurality of first touch electrode lines 210. The pad portion 230 may connect the plurality of first touch electrode lines 210 to the touch controller 250.

The vibration sensing element 240 may be positioned at the central portion of the first active region AA1 to be able to sense a vibration generated when the first active region AA1 or the second active region AA2 is touched. When a user touches the first active region AA1 or the second active region AA2, the vibration propagates along a surface of the first active region AA1 or the second active region AA2 from a position touched by the user, and the vibration sensing element 240 senses the vibration propagated along the surface of the first active region AA1 or the second active region AA2. The vibration sensing element 240 may include a piezo element.

The touch controller 250 is connected to the pad portion 230 and the vibration sensing element 240. The touch controller 250 may be positioned inside a cylindrical shape provided or formed by the first active region AA1 and the second active region AA2. The touch controller 250 may be connected to the plurality of pads P1-Pn of the pad portion 230 through a plurality of first connecting lines 235, and may be connected to the plurality of first touch electrode lines 210 through the pad portion 230. The touch controller 250 may be connected to the vibration sensing element 240 through a second connecting line 245. The plurality of first connecting lines 235 and the second connecting line 245 may be included in a flexible circuit board (not shown) and the like, and the touch controller 250 may be connected to the pad portion 230 and the vibration sensing element 240 through the flexible circuit board. Although the pad portion 230 and the vibration sensing element 240 are shown to be separated from each other for explaining the structure in which the touch controller 250 is connected to the pad portion 230 and the vibration sensing element 240 in FIG. 2, the pad portion 230 may be positioned to surround the vibration sensing element 240.

The touch controller 250 may receive a first touch signal from the plurality of first touch electrode lines 210 and receive a second touch signal from the vibration sensing element 240 to generate and output touch coordinates including a touch angle and a touch distance. This will be described later with reference to FIG. 4.

Hereinafter, a structure of the display device 10 including a display panel 100, a touch sensor 200, and a window 300 will be described with reference to FIG. 3. FIG. 3 illustrates the structure of the display panel 100, the touch sensor 200, and the window 300 in the second active region AA2. Since the structures of the display panel 100, the touch sensor 200, and the window 300 in the first active region AA1 are the same as those in the second active region AA2 except that the first touch electrode line 210 is positioned instead of the second touch electrode line 220, a description thereof will be omitted. The display panel 100 of FIG. 3 shows a cross-section of a driving transistor and a light emitting element.

The display panel 100 includes a substrate 110, a driving transistor TR, a light-emitting diode LED, and an encapsulation layer 195.

In an exemplary embodiment, the substrate 110 includes an insulating material such as glass, plastic, etc., and a buffer layer 120 is positioned on the substrate 110. The buffer layer 120 may serve to prevent penetration of unwanted components such as impurities or moisture and to flatten a surface on which the driving transistor TR is positioned. The buffer layer 120 is not necessarily required, and may be omitted depending on a type of the substrate 110 and a process condition.

A gate electrode 155 is positioned on the buffer layer 120. A first insulating layer 121 is positioned on the gate electrode 155 and the buffer layer 120. A semiconductor layer 132 made of amorphous silicon, polysilicon, or an oxide semiconductor is positioned on the first insulating layer 121. The semiconductor layer 132 overlaps the gate electrode 155. The first insulating layer 121 may be a single-layer made of a silicon nitride, a silicon oxide, or the like, or a dual layer in which a silicon nitride and a silicon oxide are stacked. A second insulating layer 160 is positioned on the semiconductor layer 132 and the first insulating layer 121. A source electrode 176 and a drain electrode 177 facing each other are positioned on the second insulating layer 160. The source electrode 176 may be connected to one end of the semiconductor layer 132 through a contact hole defined by the second insulating layer 160. The drain electrode 177 may be connected to the other end of the semiconductor layer 132 through another contact hole defined by the second insulating layer 160. The driving transistor TR includes the gate electrode 155, the source electrode 176, the drain electrode 177, and the semiconductor layer 132. A channel of the driving transistor TR is formed at the semiconductor layer 132 between the source electrode 176 and the drain electrode 177.

A third insulating layer 181 is positioned on the driving transistor TR and the second insulating layer 160. In an exemplary embodiment, the third insulating layer 181 may include an organic insulating material or an inorganic insulating material. A pixel electrode 710 is positioned on the third insulating layer 181, and the pixel electrode 710 is connected to the drain electrode 177 of the driving transistor TR through a first contact hole H defined by the third insulating layer 181. The driving transistor TR provides a current corresponding to a data voltage to the pixel electrode 710. An emission layer 720 is positioned on the pixel electrode 710, and a power electrode 730 is positioned on the emission layer 720. The emission layer 720 may include at least one of an organic light emitting material and an inorganic light emitting material. One of the pixel electrode 710 and the power electrode 730 may be a reflective electrode, and the other thereof may be a transflective electrode. In an exemplary embodiment, for example, when the display device is a top emission type, the pixel electrode 710 may be a reflective electrode and the power electrode 730 may be a transflective electrode.

The light-emitting diode LED includes the pixel electrode 710, the emission layer 720, and the power electrode 730. The pixel electrode 710 may be an anode of the light-emitting diode LED, and the power electrode 730 may be a cathode of the light-emitting diode LED. In other exemplary embodiments, the pixel electrode 710 may be a cathode of the light-emitting diode LED, and the power electrode 730 may be an anode of the light-emitting diode LED. Holes and electrons are injected from the pixel electrode 710 and the power electrode 730 into the emission layer 720, and light is emitted when excitons formed by the injected holes and electrons fall from an excited state to a ground state. The light-emitting diode LED may emit one of primary colors. The primary colors may be three primary colors such as red, green, and blue. Alternatively, the primary colors may be yellow, cyan, magenta, etc.

The light emitted from the emission layer 720 is reflected by the pixel electrode 710, and is inputted to the power electrode 730. Some of the light inputted to the power electrode 730 passes through the power electrode 730 to proceed to a user, and the remaining thereof proceed to the pixel electrode 710.

As such, since the pixel electrode 710 includes a metal material having high reflectance and the power electrode 730 includes a metal material having a transflective characteristic in an exemplary embodiment, the light emitted from the emission layer 720 is resonated between the pixel electrode 710 and the power electrode 730 such that light of a specific wavelength is amplified and emitted to the user, thereby increasing optical efficiency and a color reproduction ratio.

A pixel defining layer 190 defining a region of the light-emitting diode LED, that is, a pixel region from which light is emitted, may be positioned around the pixel electrode 710. The pixel defining layer 190 may be positioned on a portion of the pixel electrode 710, and the emission layer 720 may be positioned on the pixel electrode 710 that is not covered by the pixel defining layer 190. A region in which the emission layer 720 is positioned may be a pixel region.

The encapsulation layer 195 for protecting the light-emitting diode LED may be positioned on the light-emitting diode LED. The encapsulation layer 195 may include an organic insulating material or an inorganic insulating material.

The touch sensor 200 may be positioned on the display panel 100. As shown in FIG. 3, a second touch electrode line 220 may be positioned on the encapsulation layer 195. That is, the encapsulation layer 195 may be a supporting layer for supporting the second touch electrode line 220. A passivation layer 225 for protecting the second touch electrode line 220 may be positioned on the second touch electrode line 220. The passivation layer 225 may include an organic insulating material or an inorganic insulating material.

The window 300 for protecting the display panel 100 and the touch sensor 200 from an external impact may be positioned on the passivation layer 225. In an exemplary embodiment, the window 300 may include transparent glass, plastic, etc.

Similarly, the first touch electrode line 210 is positioned on the encapsulation layer 195 in the first active region AA1, and the passivation layer 225 for protecting the first touch electrode line 210 may be positioned on the first touch electrode line 210. The window 300 may be positioned on the passivation layer 225. The first touch electrode line 210 and the second touch electrode line 220 may be positioned at the same layer in the first and second active regions AA1 and AA2 respectively and connected to each other. As such, the touch sensor 200 including the first touch electrode line 210 and the second touch electrode line 220 is positioned on the encapsulation layer 195 of the display panel 100, thereby making or forming the display device 10 to perform a touch function.

The window 300 may contact the vibration sensing element 240 in the first active region AA1, and may serve as a medium for transmitting vibration caused by a touch of a user in the first active region AA1 or the second active region AA2.

As described above, although it is exemplarily described that the display panel 100 includes the light-emitting diode LED and the touch sensor 200 is positioned on the display panel 100 in FIG. 3, the configuration of the display panel 100 or the position of the touch sensor 200 are not limited thereto, and they may be variously changed and designed. In another exemplary embodiment, for example, the touch sensor 200 may be positioned inside the display panel 100, or the touch sensor 200 may be manufactured as a touch panel in which the first touch electrode line 210 and the second touch electrode line 220 are positioned on a separate substrate to be attached to the display panel 100.

Hereinafter, a driving method of the touch sensor 200 described in FIG. 1 to FIG. 3 will be described with reference to FIG. 4.

Figure 4:
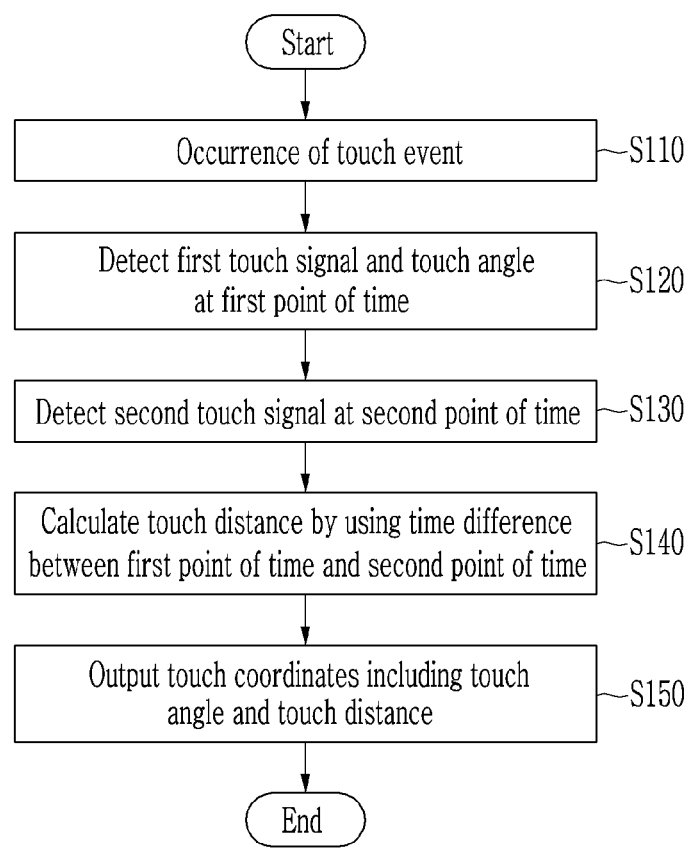
FIG. 4 illustrates an exemplary embodiment of a driving method of a touch sensor according to the invention.

FIG. 4 illustrates an exemplary embodiment of a driving method of a touch sensor according to the invention.

Referring to FIG. 1 to FIG. 4, when a user touches the first active region AA1 or the second active region AA2, a touch event occurs (S110).

Hereinafter, a case in which the user touches an arbitrary point of the second active region AA2 will be described as an example.

The touch controller 250 may apply a driving signal to the plurality of first touch electrode lines 210 and the plurality of second touch electrode lines 220 connected to the plurality of first touch electrode lines 210. In addition, the touch controller 250 may detect a capacitance change of the plurality of first touch electrode lines 210 and the plurality of second touch electrode lines 220 to detect a touch angle corresponding to the touch position of the user. That is, the capacitance of the second touch electrode line 220 corresponding to the touch position of the user is changed, and the first touch signal indicating the change of capacitance is received to the touch controller 250 through the first touch electrode line 210. Since the plurality of first touch electrode lines 210 may extend from the central portion of the first active region AA1 to the outside thereof at a predetermined angular interval around the central portion of the first active region AA1, the touch controller 250 may detect a touch angle corresponding to the first touch electrode line 210 from which the first touch signal is received. The touch angle is an angle between a direction of the first touch electrode line 210 from which the first touch signal is received and the first direction D1 measured in a counterclockwise direction or a clockwise direction with respect to the central portion of the first active region AA1 in a plan view (e.g., view in the third direction D3). As such, after the touch event occurs, the touch controller 250 may detect the first touch signal and the touch angle at a first point of time (S120).

In addition, the vibration occurred when the user contacts and touches the arbitrary point of the second active region AA2 is transmitted to the vibration sensing element 240 along the surfaces of the second active region AA2 and the first active region AA1. The vibration due to the touch may be transmitted through the window 300 described in FIG. 3 as a medium. When the vibration due to the touch is sensed, the vibration sensing element 240 may generate the second touch signal indicating the vibration and transmit it to the touch controller 250. The vibration due to the touch is transmitted to the vibration sensing element 240 later than the first point of time since it is transmitted through the medium, while the first touch signal indicating the capacitance change of the first touch electrode line 210 and the second touch electrode line 220 is due to movement of electrons. Accordingly, the touch controller 250 may receive the second touch signal from the vibration sensing element 240 at a second point of time later than the first point of time. As such, after the touch event occurs, the touch controller 250 may detect the second touch signal at the second point of time (S130).

The touch controller 250 may calculate a touch distance based on a time difference between the first point of time when the first touch signal is detected and the second point of time when the second touch signal is detected in the touch controller 250 (S140). The touch distance is the shortest distance from the central portion of the first active region AA1 in which the vibration sensing element 240 is positioned to the touch position along the surfaces of the first active region AA1 and the second active region AA2. In an exemplary embodiment, for example, the touch distance may be a sum of a distance from the touch position of the second active region AA2 to an edge of the first active region AA1 in the third direction D3 and a radius of the first active region AA1. When the touch position is an arbitrary point of the first active region AA1, the touch distance may be a distance from the touch position to the central of the first active region AA1, i.e., the vibration sensing element 240. Since a propagation speed of the vibration through the medium may be predetermined according to a kind of the medium, the touch distance may be calculated by calculating the time difference between the first point of time and the second point of time.

The touch controller 250 may output touch coordinates including the touch angle and the touch distance (S150). The touch coordinates including the touch angle and the touch distance may indicate a position in a cylindrical coordinate system, and may indicate the touch position in the cylindrical shape provided or formed by the first active region AA1 and the second active region AA2.

In some exemplary embodiments, even in a case of multiple touches in which the user touches two or more positions, the touch positions may be detected in the same manner as described above. In the case of the multiple touches, vibrations may be propagated and overlapped at two or more touch positions, but one vibration thereof does not interfere with the other vibration, and propagation speeds of the two or more vibrations may be maintained to be the same. Thus, the vibration sensing element 240 may generate respective second touch signals for the two or more vibrations to transmit them to the touch controller 250.

It has been described that the touch controller 250 applies the driving signal to the plurality of first touch electrode lines 210 and the plurality of second touch electrode lines 220 connected to the plurality of first touch electrode lines 210 and the touch angle is detected by a self-cap method measuring the capacitance change of the plurality of first touch electrode lines 210 and the plurality of second touch electrode lines 220. However, the touch angle may be detected in various methods that are capable of sensing whether or not a touch has occurred, and the kind of a method that is capable of sensing whether or not a touch has occurred is not limited. In an exemplary embodiment, for example, by sensing whether or not a touch has occurred through a method in which the touch controller 250 applies the driving signal to some of the plurality of first touch electrode lines 210 and receives the first touch signal indicating the capacitance change from others thereof, it is possible to detect the touch angle. In another exemplary embodiment, the touch controller 250 may receive the first touch signal indicating resistance change of the plurality of first touch electrode lines 210 and the plurality of second touch electrode lines 220 to sense whether or not a touch has occurred, thereby detecting the touch angle.

Figure 7:
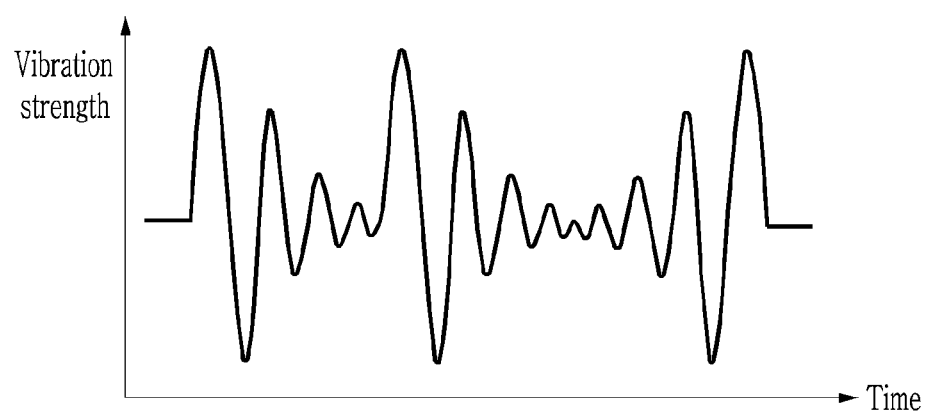
FIG. 7 illustrates an example of noise that may occur in the apparatus of FIG. 5.

Hereinafter, exemplary embodiments of an apparatus to which the display device 10 according to the invention may be applied will be described with reference to FIG. 5 and FIG. 7.

Figure 5:
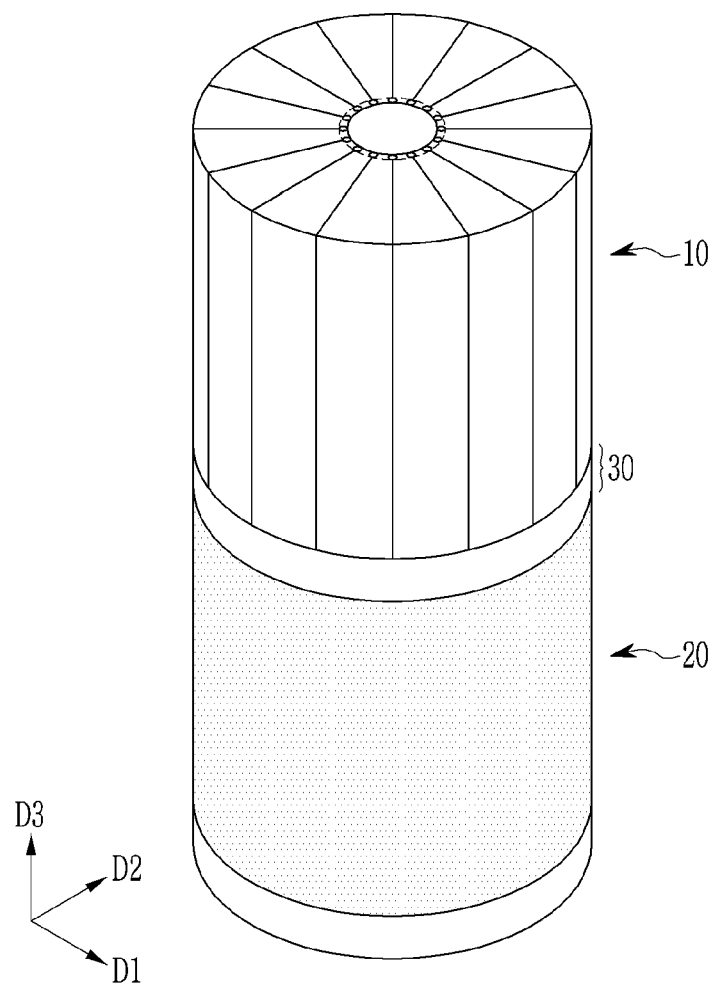
FIG. 5 illustrates an exemplary embodiment of an apparatus including a display device according to the invention.
Figure 6:
FIG. 6 illustrates an example of a second touch signal detected by a touch controller of the apparatus of FIG. 5.

FIG. 5 illustrates an exemplary embodiment of an apparatus including a display device according to the invention. FIG. 6 illustrates an example of a second touch signal detected by a touch controller of the apparatus of FIG. 5. FIG. 7 illustrates an example of noise that may occur in the apparatus of FIG. 5.

As shown in FIG. 5, the display device 10 may be mounted on a speaker 20. That is, the display device 10 mounted on the speaker 20 may display an image related to control of the speaker 20 and an operation of the speaker 20, and may support input of a user command by the user's touch.

A vibration absorbing layer 30 may be positioned between the display device 10 and the speaker 20. The vibration absorbing layer 30 may block vibration caused by sound generated by the speaker 20 from being transmitted to the display device 10. That is, the vibration absorbing layer 30 may block the vibration caused by the sound generated by the speaker 20 from being transmitted to the vibration sensing element 240 of the display device 10. In an exemplary embodiment, the vibration absorbing layer 30 may include a viscous adhesive capable of absorbing sound, such as silicon, rubber, and the like. In another exemplary embodiment, the vibration absorbing layer 30 may include a soundproof material including glass fiber, rock wool, felt, cork, a soft fiber board, or the like which is capable of absorbing sound.

In addition, the touch controller 250 may process the vibration of the speaker 20 as noise and detect the vibration caused by the touch of the user. For example, as shown in FIG. 6, the vibration caused by the touch of the user may be a spot vibration, and be maintained for a short time and in a narrow area, and a vibration time thereof is short. However, as shown in FIG. 7, the vibration caused by the sound of the speaker 20 may be maintained for a long time and in a wide area, and a vibration time thereof is long. Therefore, the touch controller 250 may store characteristics or kinds of the vibration caused by the touch of the user, and may receive only signals corresponding to the characteristics or the kinds of the vibration caused by the touch of the user as the second touch signals. In contrast, the touch controller 250 may process the signals not corresponding to the characteristics or the kinds of the vibration caused by the touch of the user as noise.

Hereinafter, various types of display devices will be described with reference to FIG. 8 to FIG. 11. Compared with the exemplary embodiments of FIG. 1 to FIG. 7 described above, differences will be mainly described.

Figure 8:
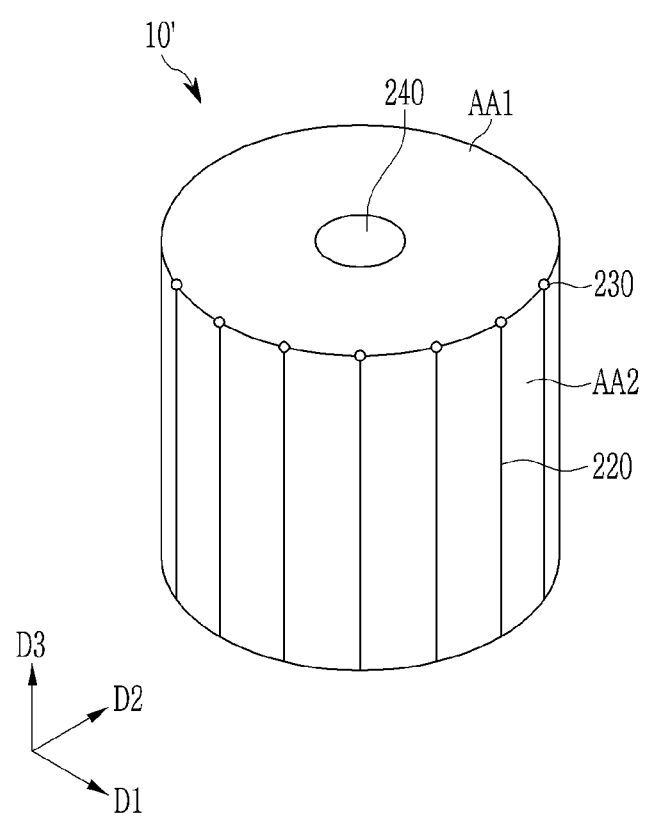
FIG. 8 illustrates another exemplary embodiment of a display device according to the invention.

FIG. 8 illustrates another exemplary embodiment of a display device according to the invention.

Referring to FIG. 8, a display device 10' includes the first active region AA1, the second active region AA2, the second touch electrode line 220, the pad portion 230, and the vibration sensing element 240.

Compared with the display device 10 of FIG. 1, in the display device 10', the plurality of first touch electrode lines 210 is omitted in the first active region AA1, the pad portion 230 is positioned in the second active region AA2, and the plurality of second touch electrode lines 220 are directly connected to the pad portion 230. The display panel 100 may be omitted in the first active region AA1. Alternatively, only the display panel 100 without the touch sensor 200 may be positioned in the first active region AA1.

As shown in FIG. 8, the pad portion 230 may be positioned at an edge of the second active region AA2 adjacent to the first active region AA1 and be connected to one end of each of the second touch electrode lines 220. In some exemplary embodiments, the pad portion 230 may be positioned at an edge of the second active region AA2 that is not adjacent to the first active region AA1 and be connected to the other end of each of the second touch electrode lines 220.

The touch controller 250 receives the first touch signal from at least one of the plurality of second touch electrode lines 220 to detect the touch angle, and receives the second touch signal from the vibration sensing element 240. The touch controller 250 may calculate the touch distance from the touch position to the first active region AA1 in the third direction D3 based on the time difference between the first point of time when the first touch signal is received and the second point of time when the second touch signal is received in the touch controller 250.

Except for these differences, the features of the exemplary embodiments described above with reference to FIG. 1 to FIG. 7 may be wholly applied to the exemplary embodiment described with reference to FIG. 8, so that redundant descriptions are omitted.

Figure 9:
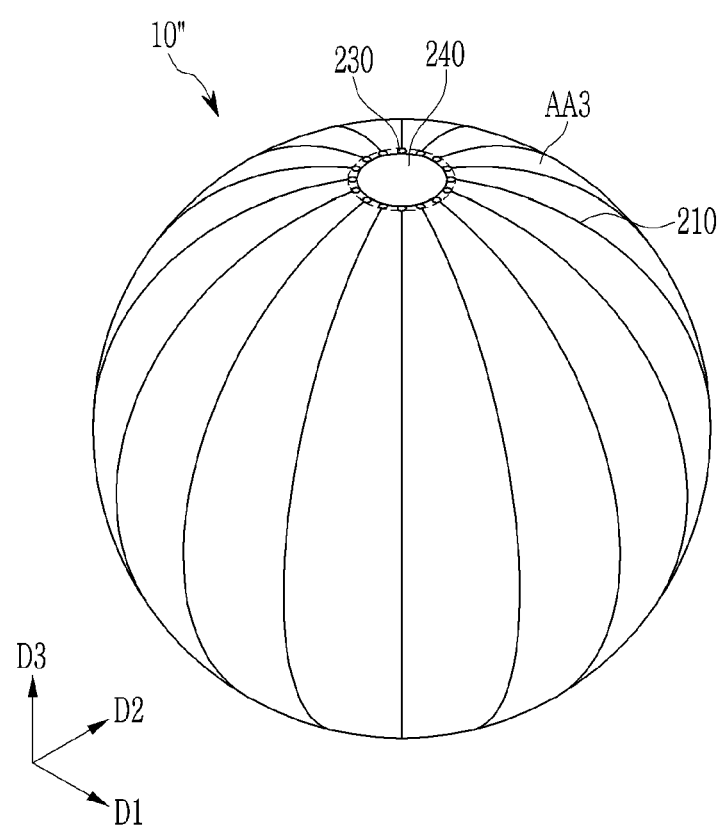
FIG. 9 illustrates still another exemplary embodiment of a display device according to the invention.

FIG. 9 illustrates still another exemplary embodiment of a display device according to the invention.

Referring to FIG. 9, a display device 10" includes a spherical active region AA3, the first touch electrode line 210, the pad portion 230, and the vibration sensing element 240.

Compared with the display device 10 of FIG. 1, the display device 10" includes the spherical active region AA3 provided with a surface including a central portion at which the vibration sensing element 240 is positioned, instead of the first active region AA1 and the second active region AA2. In addition, the plurality of first touch electrode lines 210 may extend from the pad portion 230 positioned to be adjacent to the vibration sensing element 240 along a surface of the spherical active region AA3 in a radial form at a predetermined angular interval around the pad portion 230. The second touch electrode line 220 is omitted. The display panel 100 may have a spherical shape corresponding to the spherical active region AA3.

The touch controller 250 receives the first touch signal from at least one of the plurality of first touch electrode lines 210 to detect the touch angle, and receives the second touch signal from the vibration sensing element 240. The touch controller 250 may calculate the touch distance from the touch position to the central portion at which the vibration sensing element 240 is positioned along the surface of the spherical active region AA3 based on the time difference between the first point of time when the first touch signal is received and the second point of time when the second touch signal is received in the touch controller 250.

Except for these differences, the features of the exemplary embodiments described above with reference to FIG. 1 to FIG. 7 may be wholly applied to the exemplary embodiment described with reference to FIG. 9, so that redundant descriptions are omitted.

Figure 10:
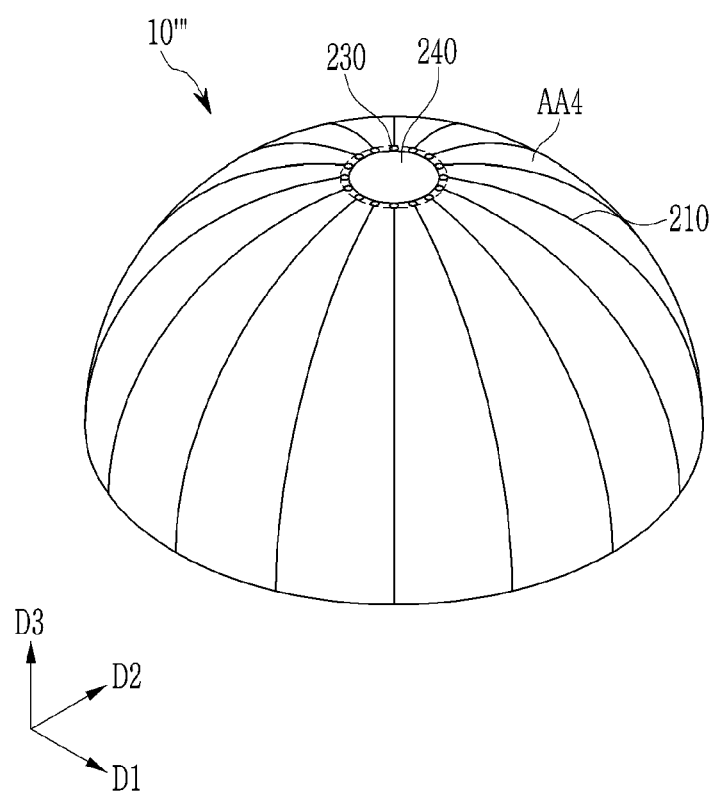
FIG. 10 illustrates still another exemplary embodiment of a display device according to the invention.

FIG. 10 illustrates still another exemplary embodiment of a display device according to the invention.

Referring to FIG. 10, a display device 10''' includes a hemispherical active region AA4, the first touch electrode line 210, the pad portion 230, and the vibration sensing element 240.

Compared with the display device 10 of FIG. 1, the display device 10''' includes the hemispherical active region AA4 provided with a surface including a central portion at which the vibration sensing element 240 is positioned, instead of the first active region AA1 and the second active region AA2. In addition, the plurality of first touch electrode lines 210 may extend from the pad portion 230 positioned to be adjacent to the vibration sensing element 240 along a surface of the hemispherical active region AA4 in a radial form at a predetermined angular interval around the central portion. The second touch electrode line 220 is omitted. The display panel 100 may have a spherical shape corresponding to the hemispherical active region AA4.

The touch controller 250 receives the first touch signal from at least one of the plurality of first touch electrode lines 210 to detect the touch angle, and receives the second touch signal from the vibration sensing element 240. The touch controller 250 may calculate the touch distance from the touch position to the central portion at which the vibration sensing element 240 is positioned along the surface of the hemispherical active region AA4 based on the time difference between the first point of time when the first touch signal is received and the second point of time when the second touch signal is received in the touch controller 250.

Except for these differences, the features of the exemplary embodiments described above with reference to FIG. 1 to FIG. 7 may be wholly applied to the exemplary embodiment described with reference to FIG. 10, so that redundant descriptions are omitted.

Figure 11:
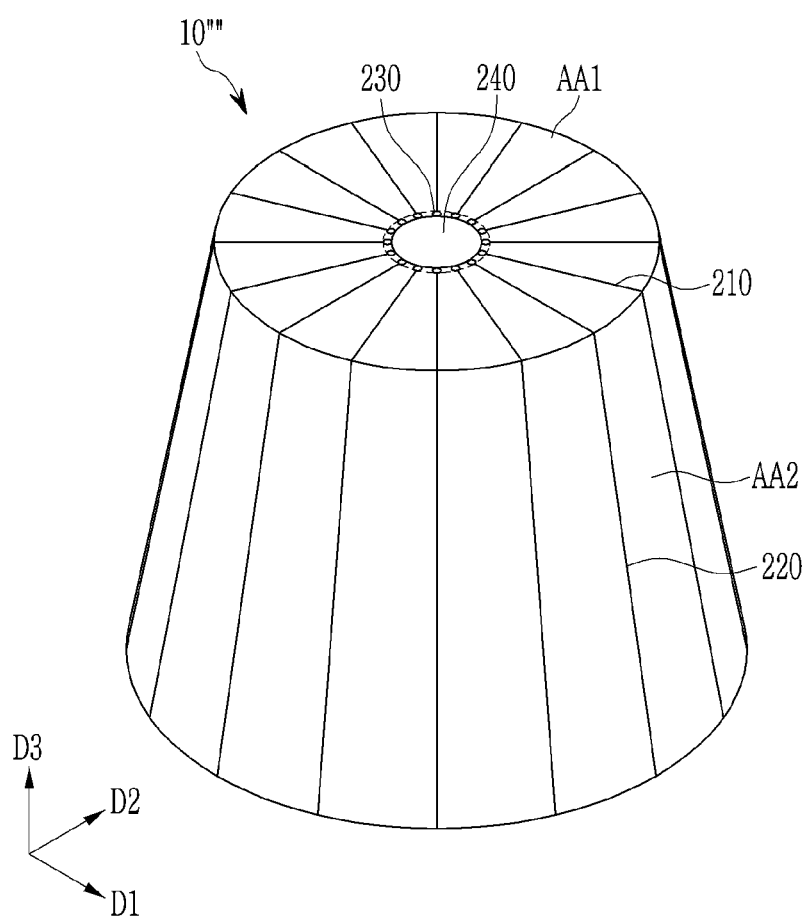
FIG. 11 illustrates still another exemplary embodiment of a display device according to the invention.

FIG. 11 illustrates still another exemplary embodiment of a display device according to the invention.

Referring to FIG. 11, the display device 10'''' includes the first active region AA1, the second active region AA2, the first touch electrode line 210, the second touch electrode line 220, the pad portion 230, and the vibration sensing element 240. A direction in which the second active region AA2 traverses the plane, which is defined or formed by the first direction D1 and the second direction D2, parallel to the first active region AA1 may be acute (i.e., not perpendicular) with respect to the plane. That is, the first active region AA1 and the second active region AA2 may provide or form a conical pillar shape. The conical pillar shape may be a columnar shape in which an area of a cross-section parallel to the plane defined or formed by the first direction D1 and the second direction D2 gradually decreases toward the third direction D3 (i.e., a direction from a bottom of the second active region AA2 to a top where the first active region AA1 is located).

Except for these differences, the features of the exemplary embodiments described above with reference to FIG. 1 to FIG. 7 may be wholly applied to the exemplary embodiment described with reference to FIG. 11, so that redundant descriptions are omitted.

As described above, the first active region AA1 and the second active region AA2, the spherical active region AA3, and the hemispherical active region AA4 may provide or form symmetric three-dimensional shapes including a cylindrical shape, a conical pillar shape, a spherical shape, a hemispherical shape, and the like around a central axis which is parallel to the third direction D3 and penetrates the central of the shape. In the three-dimensional shapes, it is possible to reduce the number of touch electrode lines by detecting the touch distance by the vibration sensing element 240, reduce the manufacturing time and cost of the touch sensor 200, and improve the manufacturing yield of the touch sensor 200.

Even though a cylindrical shape, a conical pillar shape, a spherical shape, and a hemispherical shape provided by the active regions are illustrated as exemplary embodiment of the invention, kinds of the shape are not limited thereto.

Combinations thereof are possible. In another exemplary embodiment, for example, the hemispherical active region AA4 may be used instead of the first active region AA1 in the exemplary embodiments of FIG. 1, FIG. 5, or FIG. 11. In still another exemplary embodiment, for example, a conical active region (not shown) may be used instead of the first active region AA1 in the exemplary embodiments of FIG. 1, FIG. 5, or FIG. 11.

The accompanying drawings and the detailed description of the invention are only illustrative, and are used for the purpose of describing the invention but are not used to limit the meanings or scope of the invention described in the claims. Therefore, those skilled in the art will understand that various modifications and other equivalent embodiments of the invention are possible. Consequently, the true technical protective scope of the invention must be determined based on the technical spirit of the appended claims.

What is claimed is:

1. A touch sensor comprising:
a plurality of touch electrode lines which extends outwardly from a central portion thereof at a predetermined angular interval around the central portion;
a vibration sensing element positioned at the central portion; and
a touch controller which receives a first touch signal from at least one of the plurality of touch electrode lines, detects a touch angle between a touch position at which a touch occurs and a first direction with respect to the central portion, receives a second touch signal from the vibration sensing element, calculates a touch distance from the central portion to the touch position based on a time difference between a first point of time when the first touch signal is received and a second point of time when the second touch signal is received, and outputs touch coordinates including the touch angle and the touch distance.

2. The touch sensor of claim 1, further comprising:
a first active region which includes the central portion and is parallel to a plane defined by the first direction and a second direction perpendicular to the first direction; and
a second active region which is connected to an edge of the first active region and includes a lateral surface extending in a direction traversing the plane.

3. The touch sensor of claim 2, wherein
each of the plurality of touch electrode lines includes:
a first touch electrode line which extends to be parallel to the plane along the first active region; and
a second touch electrode line which is connected to the first touch electrode line and extends in the direction traversing the plane along the second active region.

4. The touch sensor of claim 3, wherein
the direction traversing the plane is a third direction perpendicular to the plane, and the first active region and the second active region define a cylindrical shape.

5. The touch sensor of claim 3, wherein
the direction traversing the plane forms an acute angle with the plane, and the first active region and the second active region define a conical pillar shape of which an area of a cross-section parallel to the plane gradually decreases toward a third direction perpendicular to the plane.

6. The touch sensor of claim 1, further comprising
a spherical active region provided with a surface which includes the central portion,
wherein the plurality of touch electrode lines extends along the surface of the spherical active region.

7. The touch sensor of claim 1, further comprising
a hemispherical active region provided with a surface which includes the central portion,
wherein the plurality of touch electrode lines extends along the surface of the hemispherical active region.

8. A touch sensor comprising:
a first active region which is a plane parallel to a first direction and a second direction perpendicular to the first direction;
a second active region which is connected to an edge of the first active region and includes a lateral surface in a direction traversing the plane;
a vibration sensing element positioned at a central portion of the first active region;
a plurality of second touch electrode lines which extends in the direction traversing the plane along the second active region; and
a touch controller which receives a first touch signal from at least one of the plurality of second touch electrode lines, detects a touch angle between a touch position at which a touch occurs and the first direction with respect to the central portion, receives a second touch signal from the vibration sensing element, calculates a touch distance from the touch position to the first active region based on a time difference between a first point of time when the first touch signal is received and a second point of time when the second touch signal is received, and outputs touch coordinates including the touch angle and the touch distance.

9. The touch sensor of claim 8, wherein
the direction traversing the plane is a third direction perpendicular to the plane, and the first active region and the second active region define a cylindrical shape.

10. The touch sensor of claim 8, further comprising
a plurality of first touch electrode lines which extends outwardly from the central portion at a predetermined angular interval around the central portion of the first active region and is connected to the plurality of second touch electrode lines.

11. The touch sensor of claim 10, wherein
the direction traversing the plane forms an acute angle with the plane, and the first active region and the second active region define a conical pillar shape of which an area of a cross-section parallel to the plane gradually decreases toward a third direction perpendicular to the plane.

12. A display device comprising:
an active region which includes a plurality of pixels which displays an image;
a plurality of touch electrode lines which extends outwardly from a central portion of the active region at a predetermined angular interval around the central portion of the active region;
a vibration sensing element positioned at the central portion; and
a touch controller which receives a first touch signal from at least one of the plurality of touch electrode lines, detects a touch angle between a touch position at which a touch occurs and a first direction with respect to the central portion, receives a second touch signal from the vibration sensing element, calculates a touch distance from the central portion to the touch position based on a time difference between a first point of time when the first touch signal is received and a second point of time when the second touch signal is received, and outputs touch coordinates including the touch angle and the touch distance.

13. The display device of claim 12, wherein
the active region further includes:
a first active region which includes the central portion and is a plane parallel to the first direction and a second direction perpendicular to the first direction; and
a second active region which is connected to an edge of the first active region and includes a lateral surface in a direction traversing the plane.

14. The display device of claim 13, wherein
each of the plurality of touch electrode lines includes:
a first touch electrode line which extends in a direction parallel to the plane along the first active region; and
a second touch electrode line which is connected to the first touch electrode line and extends in the direction traversing the plane along the second active region.

15. The display device of claim 14, wherein
the direction traversing the plane is a third direction perpendicular to the plane, and the first active region and the second active region define a cylindrical shape.

16. The display device of claim 14, wherein
the direction traversing the plane forms an acute angle with the plane, and the first active region and the second active region define a conical pillar shape of which an area of a cross-section parallel to the plane gradually decreases toward a third direction perpendicular to the plane.

17. The display device of claim 12, wherein
the active region includes a spherical active region provided with a surface including the central portion, and
the plurality of touch electrode lines extends along the surface of the spherical active region.

18. The display device of claim 12, wherein
the active region includes a hemispherical active region provided with a surface including the central portion, and
the plurality of touch electrode lines extends along the surface of the hemispherical active region.

19. The display device of claim 12, wherein
the active region includes a symmetric three-dimensional shape including one of a cylindrical shape, a conical pillar shape, a spherical shape, and a hemispherical shape, and
the display device further includes a speaker on which the active region of the symmetric three-dimensional shape is mounted and a vibration absorbing layer positioned between the active region and the speaker and which blocks a vibration caused by a sound of the speaker.

20. The display device of claim 19, wherein
the touch controller stores a characteristic of a vibration caused by a touch, receives a signal corresponding to the characteristic of the vibration caused by the touch as the second touch signal, and processes a signal that does not correspond to the characteristic of the vibration caused by the touch of as a noise.

* * * * *